Aug. 22, 1939.   W. H. FRANK   2,170,300
CONTINUOUS OUTLET CONSTRUCTION
Original Filed Aug. 4, 1937   2 Sheets-Sheet 1

INVENTOR.
William H. Frank
BY Daniel G. Cullen
ATTORNEY.

Aug. 22, 1939.  W. H. FRANK  2,170,300
CONTINUOUS OUTLET CONSTRUCTION
Original Filed Aug. 4, 1937  2 Sheets-Sheet 2
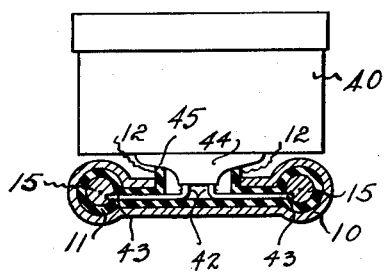
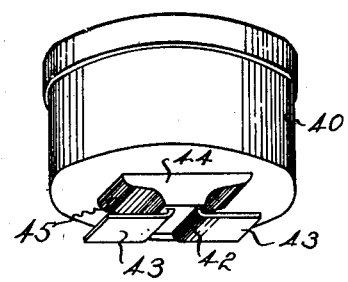
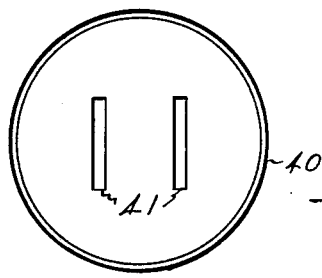
INVENTOR.
William H. Frank
BY Daniel G. Cullen
ATTORNEY.

Patented Aug. 22, 1939

2,170,300

UNITED STATES PATENT OFFICE 2,170,300

CONTINUOUS OUTLET CONSTRUCTION

William H. Frank, Detroit, Mich.

Original application August 4, 1937, Serial No. 157,269. Divided and this application January 3, 1938, Serial No. 183,231

15 Claims. (Cl. 173—334.1)

This application relates to continuous outlet constructions and more particularly to continuous outlet constructions of the type employing a slotted duct having bus bars therein for engagement with prongs of plugs interlocked and inserted into the duct for engagement with the bus bars through the slot of the duct.

This application is a division of my prior application Serial No. 157,269, filed August 4, 1937, and relates to the duct and plug combination, rather than to the duct per se, as is true of the earlier application.

For an understanding of the continuous outlet constructions herein disclosed, reference should be had to the appended drawings. In these drawings.

Figure 4:
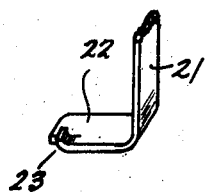

Fig. 4, in detail, shows a plug prong per se;

Fig. 5 shows a plug adapter in top plan view;

Fig. 6 shows the plug adapter in place in a duct;

Fig. 7 shows the adapter in perspective.

The duct shown includes a casing 10, an insulation liner 11, and two bus bars. The casing is formed from a thin metal ribbon or the like 10 folded as indicated. It is lined with a liner of insulation 11 formed of thin ribbon. The liner edges are preferably flanged as at 12 to form protectors for the edges of the casing at the plug receiving slot 14. Within the bights or beads of the lined casing are bus bars 15 of soft round copper wire or the like around which are formed the casing and its insulation liner.

For association with the duct there may be provided plugs 20 having prongs 21 whose ends are formed to provide fingers 22 having lugs 23 struck therefrom. The prongs are within thimbles 24 projecting from the plug proper.

When a plug is to be associated with a duct the plug thimble and prongs are inserted into the duct with the fingers 22 in longitudinal alignment with slot 14 of the duct, whereupon the prongs may be thrust into the duct sufficiently far enough to permit the fingers to enter the space between the opposite sides of the duct when the plug is rotated 90° on its axis.

When the plug is so rotated, the ends of the fingers will move towards the bus bars and engage and dig into them, such engagement being effected, not only by the ends of the fingers engaging the under surfaces of the bus bars, but also by the lugs 23 engaging and digging into the sides of the bus bars.

Figures 1, 2:
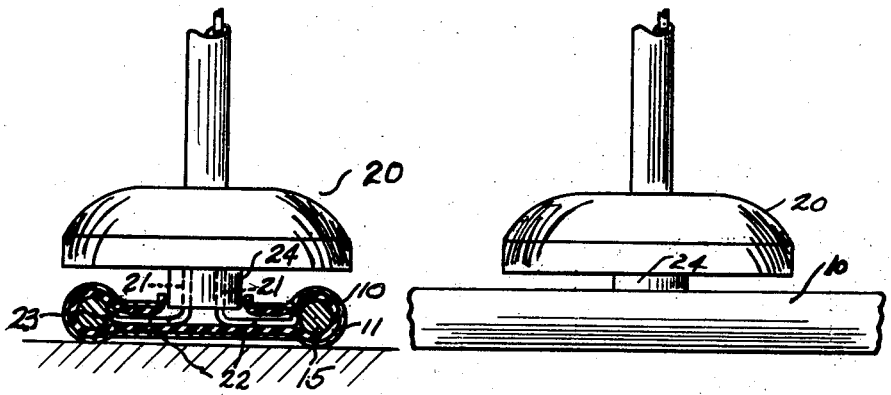
Fig. 1 is a transverse section of a duct, shown as receiving plug prongs.
Fig. 2 is a right side view of Fig. 1.
Figure 3:
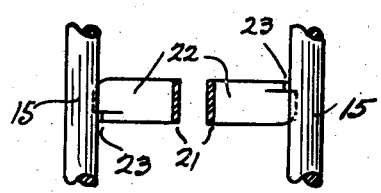
Fig. 3 is a detailed view of the prongs in engagement with the bus bars.

It will be noted that the proportions of the fingers 22 relative to the duct and bus bars are such that the portions 23 of such fingers engage the bus bars in a manner which will prevent turning of the plug beyond the connected position of Fig. 3.

It will further be noted that the feet fit closely within the insulation liner of the duct, whereby on separation of the feet from the bus bars, arcing is prevented because of the quenching action which takes place.

The friction of the parts, their interlocking relation and their relative resilience, will all insure the parts maintaining themselves in plugged-in position when plug-in is completed.

The adapter of Figs. 5–7 may be used to permit a conventional cap plug to be electrically and mechanically connected to the duct. The adapter comprises a body 40 whose top flat surface has slots 41 into which may be inserted prongs of conventional cap plugs for engagement with parts of the adapter prongs 42 whose turned out fingers are formed for engagement at their ends with bus bars of the duct, the fingers 43 of the adapter 40 corresponding to the fingers 22 of the cap plug 20.

For "keying" the adapter to the duct so that the adapter when inserted in the duct and rotated 90° will hold itself securely in place in the duct, the bottom wall of the adapter is shown as provided with rib 44 having tapered walls 45. The rib is of a length to straddle the flanges of the duct at the duct slot with the tapered walls 45 engaging the edges of such flanges and the rib is of a width slightly less than the distance between the flanges whereby the rib may be inserted into the space between the flanges and then rotated 90°.

While only the adapter 40 is shown as provided with the rib 44—45, it will be understood that the plug of Figs. 1–4 may also be provided with such a rib.

Now having described the continuous outlet construction herein shown, reference will be had to the claims which follow for a determination of the scope hereof.

I claim:

1. A continuous outlet construction comprising parallel bus bars, a hollow duct having a solid wall and a slotted wall connected at their edges by portions against which are disposed the bus bars, these being laterally remote from the free edges of the duct at the slotted wall, with the clear spaces between the solid wall and the separate parts of the slotted wall, each bounded by a bus bar and a free edge of the duct at the slotted wall, being no greater than the thickness of the bus bar measured in the same direction, in combination with connectors outside the duct and arranged with portions between the free edges of the duct and within the duct slot, and provided with laterally extending contact fingers disposed in and substantially filling the clear spaces aforesaid between the solid wall and the slotted wall of the duct to extend to the bus bars and with their ends engage the bus bars at their facing portions.

2. A continuous outlet construction comprising parallel bus bars, a hollow duct having a solid wall and a slotted wall connected at their edges by portions against which are disposed the bus bars, these being laterally remote from the free edges of the duct at the slotted wall, with the clear spaces between the solid wall and the separated parts of the slotted wall, each bounded by a bus bar and a free edge of the duct at the slotted wall, being no greater than the thickness of the bus bar measured in the same direction, in combination with connectors outside the duct and arranged with portions between the free edges of the duct and within the duct slot, and provided with laterally extending contact fingers disposed in and substantially filling the clear spaces aforesaid between the solid wall and the slotted wall of the duct to extend to the bus bars and with their ends engage the bus bars at their facing portions, the lateral distance between the bus bar engaging ends of the contact fingers being greater than the width of the duct slot, the latter being greater than the width of the contact fingers, whereby the connectors and fingers are insertable into the duct slot with the fingers in line with the duct slot and then rotatable 90° so that the fingers assume a position traversing the duct slot and at their ends engage facing sides of the bus bars.

3. A continuous outlet construction comprising parallel bus bars, a hollow duct having a solid wall and a slotted wall connected at their edges by portions against which are disposed the bus bars, these being laterally remote from the free edges of the duct at the slotted wall, with the clear spaces between the solid wall and the separated parts of the slotted wall, each bounded by a bus bar and a free edge of the duct at the slotted wall, being no greater than the thickness of the bus bar measured in the same direction, in combination with connectors outside the duct and arranged with portions between the free edges of the duct and within the duct slot, and provided with laterally extending contact fingers disposed in and substantially filling the clear spaces aforesaid between the solid wall and the slotted wall of the duct to extend to the bus bars and with their ends engage the bus bars at their facing portions, the lateral distance between the bus bar engaging ends of the contact fingers being greater than the width of the duct slot, the latter being greater than the width of the contact fingers, whereby the connectors and fingers are insertable into the duct slot with the fingers in line with the duct slot and then rotatable 90° so that the fingers assume a position traversing the duct slot and at their ends engage facing sides of the bus bars, the connectors having means for engaging the duct and restricting rotation of the connectors to the bus engaging position and not beyond.

4. A slotted duct of thin sheet material and containing bus bars and having a solid wall and a slotted wall connected at their edges by enlarged bead like portions formed around the bus bars, with the interior distance between the solid wall and the slotted wall being less than the thickness of the bus bars measured in the same direction, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

5. A slotted duct of thin sheet material and containing bus bars of round cross section and having a solid wall and a slotted wall connected at their edges by enlarged bead like portions formed around the bus bars, with the interior distance between the solid wall and the slotted wall being less than the diameter of the bus bars, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

6. A slotted duct of thin sheet material and containing bus bars and having a flat solid wall and a flat slotted wall connected at their edges by portions formed around the bus bars, with the interior clear distance between the solid wall and the slotted wall being no greater than the thickness of the bus bars measured in the same direction, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

7. A slotted duct of thin sheet material and containing bus bars and having a flat solid wall and a flat slotted wall connected at their edges by portions formed around the bus bars, with the interior clear distance between the solid wall and the slotted wall being no greater than the thickness of the bus bars measured in the same direction, the bus bars being of round cross section, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

8. A slotted duct comprising a casing formed from ribbon of thin sheet material having its edges flanged inwardly to provide a flat wall and flanges parallel thereto and defining a slot between them, the width of the duct being considerably greater than the distance between the flanges and the flat wall, and two separate and independent bus bars between the flanges, and the flat wall and disposed in the folds or merging zones of the flanges and the flat wall, the clear distance between the flanges and the flat wall being less than that between the slot and the folds, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

9. A slotted duct comprising a casing formed from ribbon of thin sheet material having its edges flanged inwardly to provide a flat wall and flanges parallel thereto and defining a slot between them, the width of the duct being considerably greater than the distance between the flanges and the flat wall, and two separate and independent bus bars between the flanges and the flat wall and disposed in the folds or merging zones of the flanges and the flat wall, the clear distance between the flanges and the flat wall being less than that between the slot and the folds, the interior of the duct being lined with insulation for insulating the bus bars from the casing, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

10. A slotted duct comprising a casing formed from ribbon of thin sheet material having its edges flanged inwardly to provide a flat wall and flanges parallel thereto and defining a slot between them, the width of the duct being considerably greater than the distance between the flanges and the flat wall, and two separate and independent bus bars between the flanges and the flat wall and disposed in the folds or merging zones of the flanges and the flat wall, the clear distance between the flanges and the flat wall being less than that between the slot and the folds, the clear distance between the flanges and the flat wall being less than the thickness of the bus bars measured in the same direction, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

11. A slotted duct formed of thin sheet material and containing bus bars and having a solid wall and a slotted wall connected at their edges by portions formed around the bus bars, with the interior distance between the solid wall and the slotted wall being less than the thickness of the bus bars measured in the same direction, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

12. A slotted duct formed of thin sheet material and containing bus bars of round cross section and having a solid wall and a slotted wall connected at their edges by portions formed around the bus bars, with the interior distance between the solid wall and the slotted wall being less than the diameter of the bus bars, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars.

13. A slotted duct having parallel, laterally spaced, longitudinally extending bus bars, and a connector having laterally extending rigid contact fingers within the duct and extending to the bus bars and with their ends engaging them, the fingers having diagonally opposed corners rounded to permit rotation of the connector as a whole between the bus bars, and diagonally opposed sharp corners for scraping the bus bar facing sides and creating a friction lock between the connector and the bus bars, these sharp corners preventing rotation of the connector in any but one direction.

14. A slotted duct of thin sheet material and containing bus bars and having a solid wall and a slotted wall connected at their edges by enlarged bead like portions formed around the bus bars, with the interior distance between the solid wall and the slotted wall being less than the thickness of the bus bars measured in the same direction, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars, the fingers having diagonally opposed corners rounded to permit rotation of the connector as a whole between the bus bars, and diagonally opposed sharp corners for scraping the bus bar facing sides and creating a friction lock between the connector and the bus bars, these sharp corners preventing rotation of the connector in any but one direction.

15. A slotted duct of thin sheet material and containing bus bars and having a flat solid wall and a flat slotted wall connected at their edges by portions formed around the bus bars, with the interior clear distance between the solid wall and the slotted wall being no greater than the thickness of the bus bars measured in the same direction, in combination with connectors outside the duct and arranged with portions within the slot of the duct and provided with laterally extending contact fingers disposed in and substantially filling the clear spaces between the solid wall and the slotted wall, these fingers being arranged to extend to the bus bars and with their ends engage the bus bars, the fingers having diagonally opposed corners rounded to permit rotation of the connector as a whole between the bus bars, and diagonally opposed sharp corners for scraping the bus bar facing sides and creating a friction lock between the connector and the bus bars, these sharp corners preventing rotation of the connector in any but one direction.

WILLIAM H. FRANK.